US012607392B2

(12) United States Patent
Deniz et al.

(10) Patent No.: US 12,607,392 B2
(45) Date of Patent: Apr. 21, 2026

(54) VALVE DEVICE FOR A HEAT-PUMP SYSTEM, HEAT-PUMP-SYSTEM HAVING SUCH A VALVE DEVICE, AND BUILDING HAVING SUCH A VALVE DEVICE OR SUCH A HEAT-PUMP SYSTEM

(71) Applicant: Vitesco Technologies GmbH, Regensburg (DE)

(72) Inventors: Hüseyin Deniz, Marl (DE); Matthias Kadler, Rüsselsheim (DE); Eduard-Siegfried Sanden, Wiesbaden (DE); Matthias Bleeck, Pentling (DE)

(73) Assignee: Vitesco Technologies GmbH, Regensburg (DE)

( * ) Notice: Subject to any disclaimer, the term of this patent is extended or adjusted under 35 U.S.C. 154(b) by 187 days.

(21) Appl. No.: 18/169,299

(22) Filed: Feb. 15, 2023

(65) Prior Publication Data

US 2023/0258376 A1     Aug. 17, 2023

(30) Foreign Application Priority Data

Feb. 16, 2022     (DE) ..................... 10 2022 201 602.5

(51) Int. Cl.
| | |
|---|---|
| *F25B 41/22* | (2021.01) |
| *F16K 11/24* | (2006.01) |
| *F16K 31/04* | (2006.01) |
| *F16K 31/42* | (2006.01) |
| *F25B 41/00* | (2021.01) |

(Continued)

(52) U.S. Cl.
CPC .............. *F25B 41/22* (2021.01); *F16K 11/24* (2013.01); *F16K 31/04* (2013.01); *F16K 31/426* (2013.01); *F25B 41/00* (2013.01);

*F25B 41/20* (2021.01); *F25B 41/24* (2021.01); *F25B 2700/19* (2013.01); *F25B 2700/21* (2013.01)

(58) Field of Classification Search
CPC .......... F25B 41/22; F16K 11/24; F16K 31/04; F16K 31/426
See application file for complete search history.

(56) References Cited

U.S. PATENT DOCUMENTS

| | | | | |
|---|---|---|---|---|
| 5,507,468 A | * | 4/1996 | Evans ..................... | F25B 41/38 251/118 |
| 5,913,577 A | | 6/1999 | Arndt | |

(Continued)

FOREIGN PATENT DOCUMENTS

| | | |
|---|---|---|
| CN | 1090382 | 8/1994 |
| CN | 201255251 | 6/2009 |

(Continued)

OTHER PUBLICATIONS

Office Action dated Oct. 26, 2023 issued in German Patent Application No. 10 2022 005 009.9.

(Continued)

*Primary Examiner* — Jonathan Bradford
(74) *Attorney, Agent, or Firm* — COZEN O'CONNOR

(57)     ABSTRACT

A valve device for a heat-pump system, having an electrical actuator arranged in or on the valve-device housing a first valve body and a second valve body are arranged in the valve-device housing of the valve device, and a heat-pump-system having such a valve device, and to a building having such a heat-pump system or such a valve device.

17 Claims, 5 Drawing Sheets

(51) Int. Cl.
       *F25B 41/20*     (2021.01)
       *F25B 41/24*     (2021.01)

(56)                    References Cited

U.S. PATENT DOCUMENTS

2015/0337972 A1 *  11/2015  Hayasaka  ............. F16K 31/406
                                                                     137/625.33
2019/0024951 A1 *   1/2019  Nishiyama  ............. F25B 41/20
2020/0163263 A1 *   5/2020  Zhang  .................. F16K 27/029

FOREIGN PATENT DOCUMENTS

CN            211400224        9/2020
DE             60100677        7/2004
EP              1970648        9/2008
EP              2949978       12/2015
JP            2015224649      12/2015
WO      WO-2012162638  A1 *  11/2012   ............. F15B 13/02
WO      WO 2015166628        11/2015

OTHER PUBLICATIONS

Office Action of corresponding German Patent Application No. 10
2022 201 602.5.
Office Action of corresponding Chinese Patent Application No.
202310116839.0, dated Dec. 24, 2025.

* cited by examiner 224,225                                    229

11

110

VALVE DEVICE FOR A HEAT-PUMP SYSTEM, HEAT-PUMP-SYSTEM HAVING SUCH A VALVE DEVICE, AND BUILDING HAVING SUCH A VALVE DEVICE OR SUCH A HEAT-PUMP SYSTEM

BACKGROUND OF INVENTION

1. Field of the Invention

The disclosure relates to a valve device for a heat-pump system, and to a heat-pump-system having such a valve device. The disclosure furthermore relates to a building having such a valve device or such a heat-pump system.

2. Description of Related Art

EP 1 970 648 A2 presents a heat-pump system having multiple valve devices.

A particular disadvantage of the devices in the prior art is that they have relatively large dimensions and are arranged in a manner distributed over the entire heat-pump system.

SUMMARY OF THE INVENTION

It is therefore one aspect of the present invention to provide an alternative valve device which is distinguished particularly by its compactness and preferably by its simple producibility. A further aspect is to provide a heat-pump system having such a valve device. Furthermore, an aspect is to provide a building having such a valve device or such a heat-pump system.

An exemplary aspect of the invention relates to a valve device for a heat-pump system, wherein the valve device has a valve-device housing, an electrical actuator, a first valve body for control or regulation of a first fluid stream, wherein the first valve body is able to be adjusted by the electrical actuator, and a second valve body for control or regulation of a second fluid stream, wherein the second valve body is able to be adjusted by the first fluid stream. Moreover, the electrical actuator is arranged in or on the valve-device housing, wherein the first valve body and the second valve body are arranged in the valve-device housing.

In this way, a particularly compact and simply producible valve device is provided.

Basically, within the scope of one aspect of the invention or the inventions, a fluid is to be understood as meaning a liquid, a working fluid and/or a refrigerant and vice versa. Fluid-tight is thus to be understood as meaning tightness with respect to a liquid, a working fluid and/or a refrigerant and vice versa. Also, a fluid stream is to be understood as meaning a throughflow quantity of a liquid, of a working fluid and/or of a refrigerant and vice versa. Also, a fluid connection is to be understood as meaning a connection for a liquid, a working fluid and/or a refrigerant and vice versa. Also, a fluid maintenance connection is to be understood as meaning a maintenance connection for a liquid, a working fluid and/or a refrigerant and vice versa. Also, a fluid pressure is to be understood as meaning a pressure, in particular a hydraulic pressure, of a liquid, a working fluid and/or a refrigerant and vice versa. Also, a fluid channel is to be understood as meaning a channel for a liquid, a working fluid and/or a refrigerant and vice versa. In particular, at least one end, preferably two ends, of at least one fluid channel leads/lead out of the valve-device housing. Preferably, the end or the ends of a fluid channel, if the fluid channel or the fluid channels leads/lead out of the valve-device housing, opens/open out into a fluid connection. A connecting channel is to be understood as meaning a fluid channel which is situated merely within the valve-device housing, and/or is formed in such a way that at least two fluid channels are connected fluidically to one another, at least two further connecting channels are connected fluidically to one another or a further connecting channel and a fluid channel are connected fluidically to one another.

Basically, the adjustability of the first and/or the second valve body means the variability of the position or location of the first and/or of the second valve body, in particular in a receptacle or in in each case one receptacle.

It is particularly advantageous if the fluid pressure of the first fluid stream is below the fluid pressure of the second fluid stream. In this way, it is possible for the first fluid stream to be controlled or to be regulated with an extremely small amount of electrical energy by the electrical actuator, whereby the second fluid stream can be controlled or regulated by the first fluid stream. For this purpose, less electrical energy is required than would be required if direct control or regulation of the second fluid stream by an electrical actuator were desirable.

It is particularly expedient if the valve device is a multi-way valve device or a four-way valve. In other words, the valve device has a multi-way valve or a four-way valve.

A preferred exemplary aspect is characterized in that the valve-device housing is formed from plastic and/or from metal. Whereas a valve-device housing composed of plastic is simple to machine, is inexpensive and does not tend toward corrosion, a valve-device housing composed of metal offers high strength at high pressures. It is also preferable if the valve-device housing is formed from plastic but has reinforcement elements composed of metal, by way of which the resistance to relatively high pressures is improved with relatively low costs. Preferably, the valve-device housing, if formed from a metal, is formed from aluminum.

A further preferred exemplary aspect is characterized in that the valve-device housing has fluid connections for the first fluid stream and second fluid stream and also fluid channels for the first fluid stream and second fluid stream. In particular, the first and second fluid streams run through the valve device.

It is particularly advantageous if the fluid connections or at least one of the fluid connections are/is in the form of a stub.

It is also advantageous if the stubs are fastened by a screw connection to the valve-device housing or are formed as one part with the valve-device housing.

A further preferred exemplary aspect is characterized in that at least a part or a predominant part of the valve-device housing, having fluid channels or the fluid channels, is of one-part form. As a result of the one-part form, firstly cumbersome assembly is avoided, and secondly fewer components and connecting elements are required, whereby greater strength is achieved. It is also particularly advantageous if the valve-device housing is of one-part form.

A further preferred exemplary aspect is characterized in that the electrical actuator is a linear actuator.

It is particularly advantageous if the electrical actuator or the linear actuator is in the form of a solenoid actuator or cylindrical coil actuator. Such actuators have in particular a cylindrical, electrically energizable coil which, when electrically energized, generates a magnetic field and, in this way, moves, that is to say attracts or repels, an armature. If the armature is coupled in terms of drive to a valve body, the valve body can be moved, that is to say adjusted. It is particularly advantageous if the valve body forms the armature, that is to say valve body and armature are of one-part form.

Also, it is advantageous if the electrical actuator or the linear actuator is a spindle actuator. Spindle actuators generally comprise an electric drive motor, for example a mechanically commutated DC motor, an electrically commutated DC motor or a stepper motor. The rotational movement of the electric drive motor is converted by a spindle into an axial, that is to say linear, movement which moves, that is to say adjusts, the valve body.

Regardless of what type of electrical actuator is used, it is advantageous if the valve device comprises a failsafe spring, which, in the event of a malfunction of the actuator, moves the actuator and/or the first valve body into a position that protects a heat-pump system having such a valve device or the valve device against damage, in particular against damage due to excessively high fluid pressures.

A further preferred exemplary aspect is characterized in that the valve-device housing has a first mounting opening for the first valve body, and/or in that the valve-device housing has a second mounting opening for the second valve body. In other words, the respective valve body is able to be introduced into the valve-device housing through the respective mounting opening.

If the valve-device housing has merely a mounting opening for the first valve body, then this is not the first mounting opening but merely a mounting opening.

If the valve-device housing has merely a mounting opening for the second valve body, then this is not the second mounting opening but merely a mounting opening.

Furthermore, it is preferable if provision is made of two mounting openings for the first valve body and/or two mounting openings for the second valve body. These in each case two mounting openings may be part of a through-bore, of a through-hole or of an aperture through the valve-device housing.

It is expedient if a, at least one, multiple or all the mounting openings are closed off, in particular closed off in a fluid-tight manner, by a, in each case one or multiple closure elements. Threaded plugs, for example, are suitable as closure elements. A flange which, screwed to the valve-device housing, closes off a mounting opening, in particular in a fluid-tight manner, is also conceivable.

A further preferred exemplary embodiment is characterized in that the first and/or the second valve body is in the form of a cylinder valve.

It is particularly advantageous if the valve-device housing has in each case one receptacle for the first and second valve bodies or the first and second cylinder valves. The first fluid stream is able to be regulated or controlled in a manner dependent on the position or location of the first valve body in the first receptacle. The position or location of the first valve body in the first receptacle is able to be varied by the electrical actuator. The second fluid stream is able to be regulated or controlled in a manner dependent on the position or location of the second valve body in the second receptacle. The position or location of the second valve body in the second receptacle is able to be varied by the first fluid stream or is at least dependent thereon. In other words, by the electrical actuator, it is possible for the position or location of the second valve body in the second receptacle to be indirectly predefined.

Also, it is advantageous if the two receptacles extend parallel to one another.

Also, it is preferable if the two receptacles are connected fluidically to one another by at least one fluid channel and/or at least one connecting channel. Furthermore, it is advantageous if the valve bodies are arranged, in particular mounted in an axially movable manner, in the respective receptacles provided for them.

It is furthermore advantageous if the first and/or the second valve body, in particular the first and/or the second cylinder valve, are/is mounted in an axially movable manner, advantageously by seal rings, in the receptacle or in their respective receptacles.

Also, it is expedient if the seal rings are formed from a plastic or from an elastomer. This increases the sealing action or improves the mounting. Furthermore, it is advantageous if there is situated in each case one seal ring in a groove at in each case one of the end portions of the valve body, of the cylinder valve, of the valve bodies or of the cylinder valves.

Furthermore, it is advantageous if the seal rings fluidically seal off a fluid space, arranged between the seal rings in an axial direction and delimited by the seal rings, the valve body and its receptacle with respect to those regions of the receptacle which are axially adjacent to the valve body. This applies preferably to both valve bodies and their respective receptacles.

Furthermore, it is expedient if the valve body(ies) has/have, in particular in a region arranged axially between the seal rings, a portion or in each case one portion which has at least one cutout.

Also, it is advantageous if the at least one cutout is formed in such a way that, by way of said cutout, at least one fluid channel, which is connected fluidically to the receptacle of the valve body, and one connecting channel, which is connected fluidically to the receptacle of the valve body, are able to be connected fluidically to one another, in particular in a manner dependent on the axial position of the valve body within its receptacle, in such a way that, by way of said cutout, at least two fluid channels, which are connected fluidically to the receptacle of the valve body, are able to be connected fluidically to one another, and/or in such a way that, by way of said cutout, at least two connecting channels, which are connected fluidically to the receptacle of the valve body, are able to be connected fluidically to one another.

Also, it is preferable if the valve body(ies) has/have, in particular in a region arranged axially between the seal rings, a portion by way of which the fluid connection or the fluid connections that is/are able to be produced by the cutout is/are completely or partially able to be interrupted fluidically, in particular in a manner dependent on the position of the valve body within the receptacle of the valve body.

Furthermore, it is advantageous if the axial positions by way of which the fluidic connections are able to be produced and are able to be interrupted differ from one another, that is to say are spaced apart in an axial direction from one another.

It is furthermore advantageous if a or the fluid channel that is connected fluidically to the receptacle of the valve body and a or the connecting channel that is connected fluidically to the receptacle of the valve body, if two or the at least two fluid channels that are connected fluidically to the receptacle of the valve body, and/or if two or the at least two connecting channels that are connected fluidically to the receptacle of the valve body are arranged offset from one another by 0° to 20°, by 80° to 100° or by 170° to 190° in a plane which extends transversely, in particular at a right angle, to the direction of extent of the receptacle. Also, it is possible to realize combinations of different angle ranges with different types of channels in all possible combinations.

A further preferred exemplary embodiment is characterized in that the valve device has at least six fluid connections, wherein the first two of the at least six fluid connections are able to be connected fluidically to a compressor, wherein the second two of the at least six fluid connections are able to be connected fluidically to a condenser and/or evaporator, and wherein the third two of the at least six fluid connections are able to be connected fluidically to a fluid store or, by a short-circuit line, directly to one another. This ensures compatibility with other assemblies of a heat-pump system, while the short-circuit line may consist of a tube or a fluid channel that, if no assemblies of a heat-pump system are connected to the third two fluid connections, directly connects one fluid connection of the third two fluid connections fluidically to the other fluid connection of the third two fluid connections. The fluid store is in particular a fluid reservoir, which is preferably configured to at least intermittently hold surplus fluid of the heat circuit that is not required for operation.

It is particularly advantageous if the at least six fluid connections of the valve device are the fluid connections for the first fluid stream and second fluid stream.

Furthermore, it is expedient if the at least six fluid connections are stubs, that is to say connecting stubs.

A further preferred exemplary embodiment is characterized in that the valve device has at least one pressure sensor, in that the valve device has at least one temperature sensor, in that the valve device has at least one temperature/pressure sensor, or in that the valve device has at least one temperature sensor and at least one pressure sensor. The valve device can be controlled or regulated, or, if a heat-pump system has such a valve device, the heat-pump system can be controlled or regulated, with the aid of the pressures and temperatures. By a the temperature/pressure sensor, the temperature and the pressure of a fluid stream can be measured by a single sensor, whereby fewer sensors are required, which simplifies assembly.

It is expedient if, for the first fluid stream, a pressure sensor and a temperature sensor or, as an alternative to this, a temperature/pressure sensor are/is provided. It is also expedient if, for the second fluid stream, a further pressure sensor and a further temperature sensor or, as an alternative to this, a further temperature/pressure sensor are/is provided. Alternatively, different sensor types and arrangements for the two fluid streams are possible.

Furthermore, it is preferable if the pressure sensor, the temperature sensor or the temperature/pressure sensor is in fluidic contact with the respective fluid stream. This ensures a direct measurement of the respective fluid temperature or of the respective hydraulic fluid pressure.

It is furthermore expedient if the temperature sensor, the pressure sensor and/or the temperature/pressure sensor are/is connected by a screw connection to the valve-device housing. It is advantageous for this purpose if the respective sensor has an outer thread which interacts with an inner thread of the valve-device housing and the screw connection is formed in this way. The inner threads of the valve-device housing are advantageously formed by threaded inserts, which facilitates exchange of the sensors in the event of maintenance. Furthermore, it is conceivable that the sensors have elastomer seals, whereby leakage of the fluid from the valve-device housing is prevented.

A further preferred exemplary aspect is characterized in that the valve-device housing has at least one fluid maintenance connection, preferably two fluid maintenance connections. This fluid maintenance connection or the fluid maintenance connections is/are usable in particular for maintenance of the valve device, or of a heat-pump system of which such a valve device forms a part, in that, by the fluid maintenance connection or the fluid maintenance connections, the fluid for the valve device or the heat-pump system can be drained, extracted by suction, introduced or exchanged. In particular, the at least one fluid maintenance connection or the two fluid maintenance connections is/are formed in addition to the at least six fluid connections.

A further preferred exemplary embodiment is characterized in that the valve-device housing has openings that serve for formation of fluid channels or connecting channels within the valve-device housing, wherein at least one of the openings is closed off by a sensor, by one of the sensors or by the electrical actuator. It is particularly advantageous if the at least one pressure sensor, the at least one temperature sensor or the at least one temperature/pressure sensor is involved in this case.

In particular, the connecting channels connect at least two fluid channels to one another, at least two further connecting channels to one another and/or a further connecting channel to a fluid channel. Alternatively, it is possible for such an opening to open out into a fluid connection.

It is particularly advantageous if, in addition to the first variant, in addition to the first alternative or as an alternative to the first variant, the mounting opening for the first valve body or one of the mounting openings for the first valve body is closed off, in particular is closed off in a fluid-tight manner, by the electrical actuator. In this way, the need for separate closure element that serve merely for closing off these mounting openings is eliminated.

It is particularly expedient if at least one of the fluid channels fluidically opens out into a fluid connection which is in particular in the form of a stub.

In this way, the need for separate closure element that serve merely for closing off these openings is eliminated.

A further preferred exemplary aspect is characterized in that the valve device comprises a control unit and/or an interface, in particular a data interface. Data transmissible via the interface or data interface in particular measurement signals of the sensors and/or control signals for the electrical actuator. It is particularly expedient if the control unit is arranged in the valve device, on the valve device or spaced apart from the valve device.

It is particularly advantageous if the control unit is configured to carry out a fault diagnosis of a heat-pump system having such a valve device and/or of the valve device. Furthermore, it is preferable if the control unit is additionally or alternatively configured to execute a maintenance mode.

It is also advantageous if the control unit is additionally or alternatively configured to control or to regulate a heat-pump system having such a valve device and/or the valve device.

Also, it is preferable if the temperature sensors, pressure sensors, the electrical actuator and/or temperature/pressure sensors are/is connected in a signal-transmitting manner to the control unit.

Furthermore, it is advantageous if the electrical actuator is able to be regulated or controlled by the control unit, and moreover is connected in a signal-transmitting manner to the control unit.

It is furthermore advantageous if the control unit is arranged on the valve-device housing or in the valve-device housing.

Also, it is expedient if the control unit is connected in a signal-transmitting manner to the interface, wherein, by the interface, the fault signals and/or measurement signals of the sensors, of the electrical actuator or of a heat-pump system, if same has such a valve device, are able to be output.

If the valve device has merely the interface, that is to say has no control unit because the control unit is arranged for example outside the valve device but within a heat-pump system having the valve device, the interface is connected in a signal-transmitting manner to the electrical actuator and/or to the sensors. In other words, via the interface, the measurement signals of the sensors, for example pressure and/or temperature, are able to be read and/or the electrical actuator is able to be controlled. Moreover, it is preferable if, in this case, a control unit for the valve device or for a heat-pump system having the valve device is connected in a signal-transmitting manner to the interface.

Basically, either the interface is in the form of a hardware interface, in particular a hardware data interface, for example in the form of a female or male connector, or it is conceivable that the interface is in the form of a radio interface, in particular in the form of a radio data interface.

A preferred exemplary aspect is characterized in that the valve device is integrated into an evaporator, into a condenser or into a compressor. In other words, an evaporator, a condenser or a compressor has the valve device. In this way, even greater compactness is achieved.

Basically, within the scope of one aspect of the present invention or the inventions, a condenser, unless stated otherwise, is to be understood as meaning an apparatus in which a substance can be transferred from the gaseous state of aggregation into the liquid state of aggregation.

A preferred exemplary aspect is characterized in that a heat-pump system comprises a valve device according to the invention.

In this way, a particularly compact and simple heat-pump system is provided. It is particularly advantageous if the heat-pump system is configured and/or used for cooling and/or heating.

A further preferred exemplary aspect is characterized in that the heat-pump system comprises a compressor and also an evaporator and/or a condenser. Furthermore, it is conceivable that the heat-pump system additionally comprises a fluid store or a short-circuit line for the valve device. In other words, the heat-pump system comprises a compressor and an evaporator, a compressor and a condenser or a compressor, an evaporator and a condenser. In this case, it is particularly preferable if the heat-pump system comprises a compressor, an evaporator or a condenser into which the valve device is integrated. In this way, a particularly compact heat-pump system is provided.

A preferred exemplary aspect is characterized in that a building has a heat-pump system according to one aspect of the invention and/or has a valve device according to the invention. In this case, it is preferable if the heat-pump system is configured for controlling the temperature of the building.

Furthermore, it is preferable if a vehicle comprises a heat-pump system according to the invention which is configured in particular for controlling the temperature of the vehicle, preferably of a passenger compartment of the vehicle. The vehicle is preferably a motor vehicle with an electric-motor traction drive.

The temperature control basically comprises cooling and/or heating.

Advantageous refinements of the present invention are described in the dependent claims and in the following description of the figures.

BRIEF DESCRIPTION OF THE DRAWINGS

The invention will be discussed in detail below on the basis of exemplary embodiments with reference to the drawings. In the drawings.

DETAILED DESCRIPTION OF THE PREFERRED EMBODIMENTS

Figure 1:
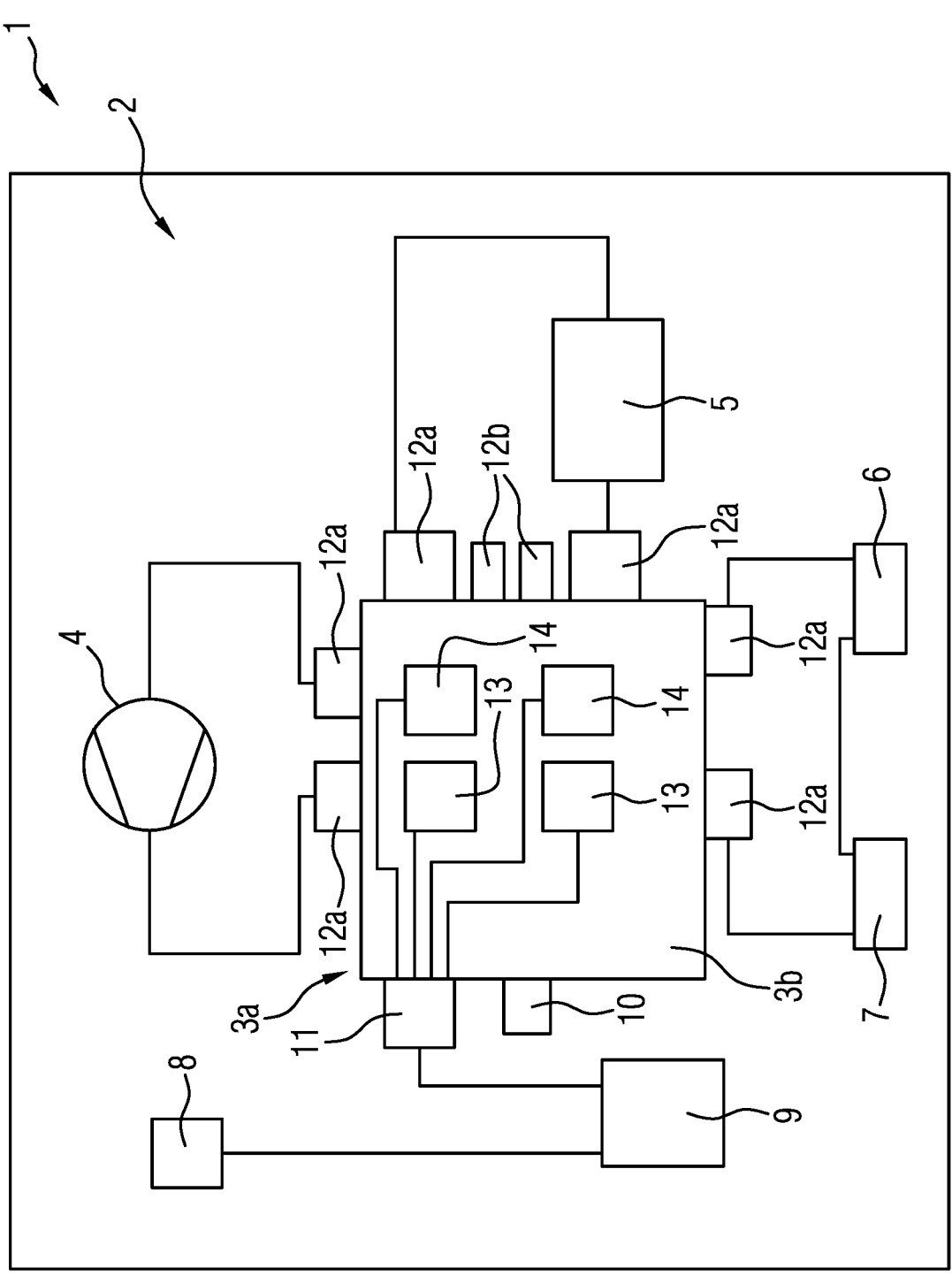
FIG. 1 is a building according to one aspect of the invention.

FIG. 1 shows a building 1 according to one aspect of the invention with a heat-pump system 2 according to one aspect of the invention and with a valve device 3a according to one aspect of the invention. The building 1 is for example a residential building or a commercial building that is able to be heated and able to be cooled by the heat-pump system 2. The valve device 3a and thus the heat-pump system 2 can be controlled or regulated by a control unit 9. The control unit 9 is on the one hand connected in a data-transmitting manner to a thermostat 8, by which the desired temperature within the building can be set, and on the other hand connected in a data-transmitting manner to an interface 11 of the valve device 3a. The interface 11 is in the form of a hardware data interface, by which transmission of measurement signals from temperature sensors 13 of the valve device 3a and from pressure sensors 14 of the valve device 3a to the control unit 9 is possible. The temperature sensors 13 and the pressure sensors 14 measure the temperatures and the pressures of a first refrigerant stream and of a second refrigerant stream, wherein the two refrigerant streams are controlled or regulated by the valve device 3a. The valve device 3a furthermore has six fluid connections 12a to which a compressor 4 of the heat-pump system 2, an evaporator 6 of the heat-pump system 2 and a condenser 7 of the heat-pump system 2, and also a fluid store 5 of the heat-pump system 2, are fluidically connected. Instead of the fluid store 5, a short-circuit line which fluidically short-circuits the two fluid connections 12a directly with one another is conceivable. The condenser 7 is an apparatus in which a substance is transferable from the gaseous state of aggregation into the liquid state of aggregation. The valve device 3a furthermore has a valve-device housing 3b which is formed from plastic or, alternatively, from aluminum. Furthermore, the valve device 3a has an electrical actuator 10 by which adjustment of a first valve body within the valve-device housing 3b is possible. The first refrigerant stream can be controlled or regulated in a manner dependent on the position of the first valve body. With the aid of the first refrigerant stream, adjustment of a second valve body within the valve-device housing 3b is possible. The second refrigerant stream can be controlled or regulated in a manner dependent on the position of the second valve body. Furthermore, the valve device 3a has two fluid maintenance connections 12b by way of which filling with, drainage of or exchange of refrigerant is possible. As long as maintenance is not being carried out at the valve device 3a, the two fluid maintenance connections 12b are closed off in a refrigerant-tight manner by, in each case, one threaded plug.

Figure 2:
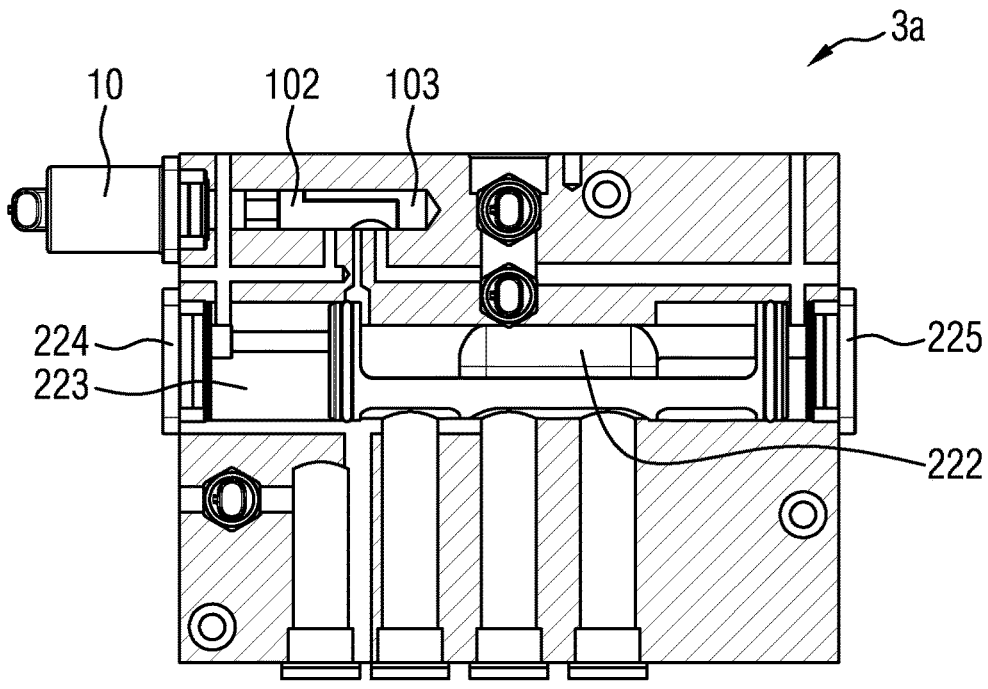
FIG. 2A is shows a valve device with a first valve-body position.
FIG. 2B is a valve device with a second valve-body position.
Figure 2:
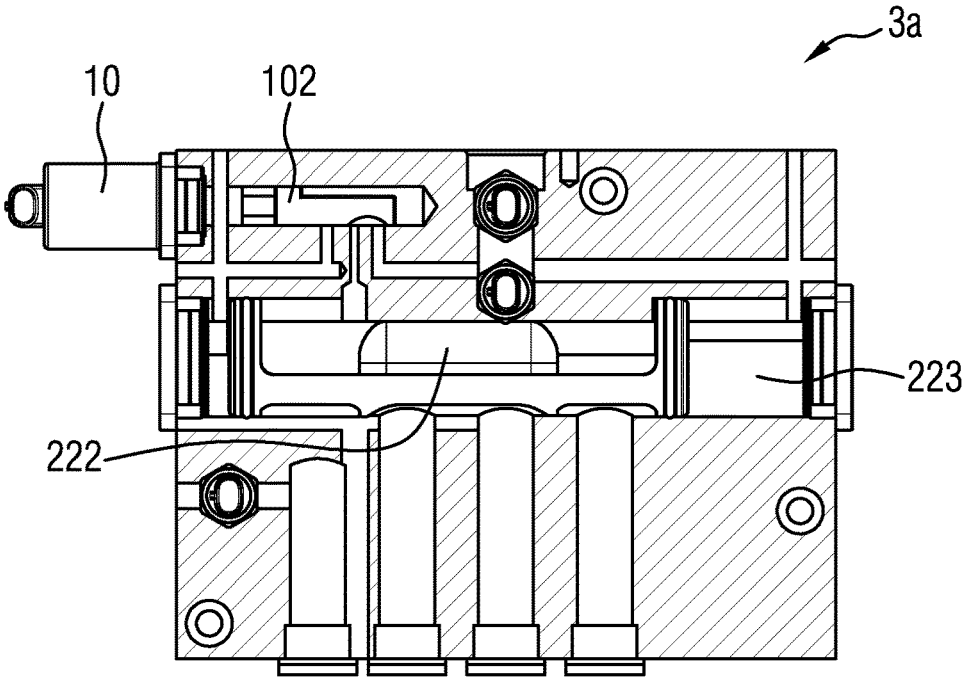

FIG. 2A shows a sectional view through the valve device 3a. The electrical actuator 10 and the first valve body 102 coupled to the electrical actuator 10 can be seen, wherein the first valve body 102 is received in a first receptacle 103 of the valve-device housing. The electrical actuator 10 closes off the first receptacle 103 in a refrigerant-tight manner. Furthermore, a second receptacle 223, in which a second valve body 222 is situated, is arranged parallel to the first receptacle 103. The second receptacle 223 is formed by a through-bore that extends through the valve-device housing of the valve device 3a. The openings at the ends of the second receptacle 223 are closed off in a refrigerant-tight manner by two closure elements 224, 225. The first receptacle 103 and the second receptacle 223, which both extend horizontally parallel to one another, are connected to one another fluidically by vertically extending connecting channels. Since the electrical actuator 10 holds the first valve body 102 in a first position, specific connecting channels are opened up or closed off, whereby the second valve body 222 assumes a first end position. In other words, the second valve body 222 has been actuated by the first refrigerant stream. With such a switching position of the valve bodies 102, 222, the heat-pump system can be operated for example in a heating mode.

FIG. 2B shows the sectional view from FIG. 2A, with the difference that the first valve body 102 is now held by the electrical actuator 10 in a second position, whereby the second valve body 222 assumes a second end position in the second receptacle 223. Here, too, the second valve body 222 has been actuated by the first refrigerant stream, since the first valve body 102 is in a different position from that in FIG. 2A. With such a switching position of the valve bodies 102, 222, the heat-pump system can be operated for example in a cooling mode.

Figure 3:
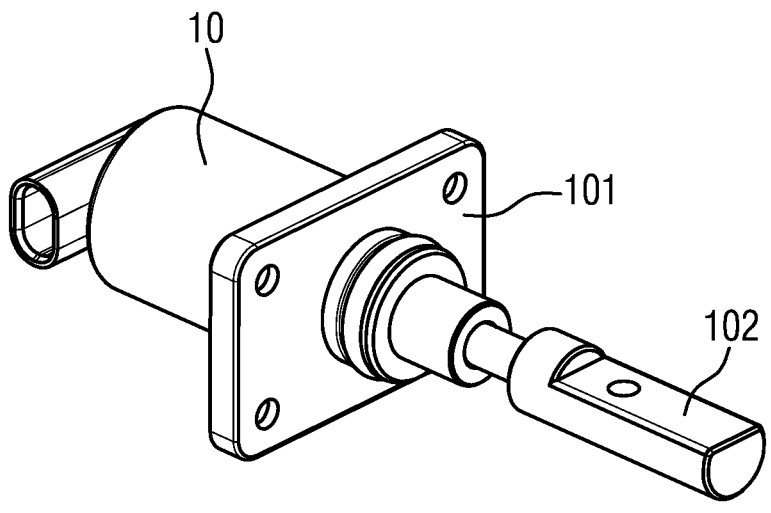
FIG. 3 is an electrical actuator of the valve.

FIG. 3 shows the electrical actuator 10 from the previous figures. It can be seen that the electrical actuator 10 is coupled in terms of drive to the first valve body 102, whereby the electrical actuator 10 can adjust the valve body 102 in an axial direction. Furthermore, the electrical actuator 10 has an actuator flange 101 by way of which the electrical actuator 10 is able to be mounted on the valve-device housing. Moreover, a sealing ring in the region of the actuator flange 101 ensures that no refrigerant can escape from the first receptacle into the surroundings when the electrical actuator 10 has been mounted on the valve-device housing.

Figure 4:
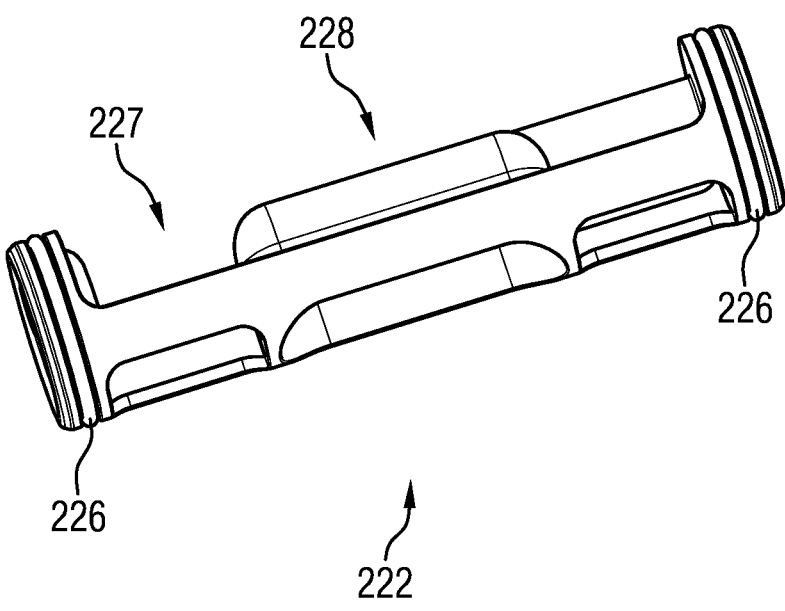
FIG. 4 is a valve body.

FIG. 4 shows the second valve body 222 from FIGS. 2A and 2B. At its end regions or end portions, the second valve body 222 has in each case one sealing ring 226, which sealing rings serve as a bearing within the second receptacle. The second valve body 222 has a first valve-body portion 227 and a second valve-body portion 228, wherein both valve-body portions 227, 228 are arranged between the two end regions of the second valve body 222. Whereas the first valve-body portion 227 has a cutout that makes it possible for one of the fluid streams to be able to flow into the second receptacle in a manner dependent on the position of the second valve body 222 in the second receptacle, the second valve-body portion is formed in such a way that it is able to interrupt one of the fluid streams from flowing into the second receptacle in a manner dependent on the position of the second valve body 222 in the second receptacle.

Figure 5:
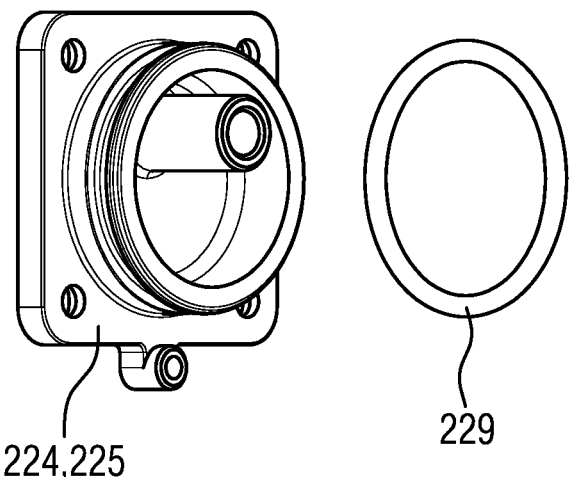
FIG. 5 is a closure element.

FIG. 5 discloses one of the two closure elements 224, 225 from FIG. 2A. It can be seen that there is likewise arranged here a sealing ring 229 for avoiding leakage of the refrigerant from the valve device. In other words, by the closure elements 224, 225, it would be ensured that the second receptacle is closed off in a manner refrigerant-tight with respect to the surroundings.

Figure 6:
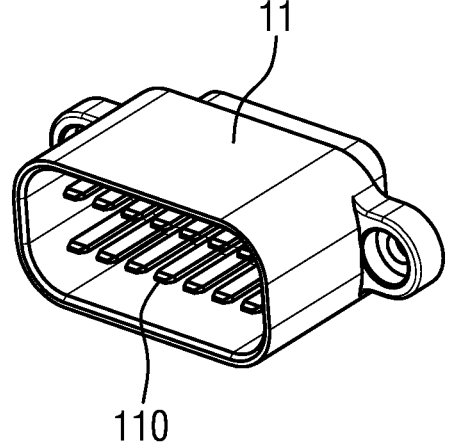
FIG. 6 is an interface.

FIG. 6 discloses the interface 11 from FIG. 1, wherein the interface 11 is in the form of a male hardware data interface and has multiple connector contacts 110.

Figure 7:
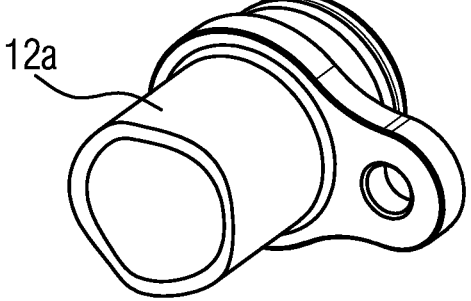
FIG. 7 is a fluid connection.

FIG. 7 discloses one of the fluid connections 12a from FIG. 1, the fluid connection 12a being produced from a corrosion-resistant material and being in the form of a fluid stub.

The different features of the individual exemplary embodiments can also be combined with one another. The exemplary embodiments in FIGS. 1 to 7 have in particular no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve device for a heat-pump system, comprising:
   a valve-device housing having a plurality of openings configured for formation of fluid channels and/or connecting channels within the valve-device housing;
   an electrical actuator arranged in or on the valve-device housing;
   a first valve body arranged in the valve-device housing and configured for control and/or regulation of a first fluid stream, wherein the first valve body is configured to be adjusted by the electrical actuator;
   a second valve body arranged in the valve-device housing and configured for control and/or regulation of a second fluid stream, wherein the second valve body is configured to be adjusted by the first fluid stream, a direction of motion of the second valve body is arranged parallel to and offset from a direction of motion of the first valve body, and
   at least one of the plurality of openings is threaded and closed off by one of a threaded:
      at least one pressure sensor,
      at least one temperature sensor,
      at least one temperature/pressure sensor, or
      at least one temperature sensor and at least one pressure sensor.

2. The valve device for a heat-pump system as claimed in claim 1, wherein the valve-device housing is plastic and/or metal.

3. The valve device for a heat-pump system as claimed in claim 1, wherein the valve-device housing has:
   fluid connections for the first fluid stream and second fluid stream; and fluid channels for the first fluid stream and second fluid stream.

4. The valve device for a heat-pump system as claimed in claim 3, wherein at least a part of the valve-device housing, having fluid channels, is of one-part form.

5. The valve device for a heat-pump system as claimed in claim 1, wherein the electrical actuator is a linear actuator.

6. The valve device for a heat-pump system as claimed in claim 1, wherein the valve-device housing has at least one of:
a first mounting opening for the first valve body, and/or
a second mounting opening for the second valve body.

7. The valve device for a heat-pump system as claimed in claim 1, wherein the first valve body and/or the second valve body is a cylinder valve.

8. The valve device for a heat-pump system as claimed in claim 1, wherein:
the valve device has at least six fluid connections;
a first two of the at least six fluid connections are configured to be connected fluidically to a compressor;
a second two of the at least six fluid connections are configured to be connected fluidically to a condenser and/or an evaporator; and
a third two of the at least six fluid connections are able to be connected fluidically to a fluid store or a short-circuit line.

9. The valve device for a heat-pump system as claimed in claim 1, wherein the valve-device housing has at least one fluid maintenance connection.

10. The valve device for a heat-pump system as claimed in claim 1,
wherein a mounting opening for the first valve body is closed off by the electrical actuator.

11. The valve device for a heat-pump system as claimed in claim 1, wherein the valve device comprises a control unit and/or an interface.

12. A heat-pump system comprising a valve device comprising:
a valve-device housing having a plurality of openings configured for formation of fluid channels and/or connecting channels within the valve-device housing;
an electrical actuator arranged in or on the valve-device housing;
a first valve body arranged in the valve-device housing and configured for control and/or a first valve body arranged in the valve-device housing and configured for control and/or regulation of a first fluid stream, wherein the first valve body is configured to be adjusted by the electrical actuator;
a second valve body arranged in the valve-device housing and configured for control and/or regulation of a second fluid stream, wherein the second valve body is configured to be adjusted by the first fluid stream, a direction of motion of the second valve body is arranged parallel to and offset from a direction of motion of the first valve body; and
at least one of the plurality of openings is threaded and closed off by one of a threaded:
at least one pressure sensor,
at least one temperature sensor,
at least one temperature/pressure sensor, or
at least one temperature sensor and at least one pressure sensor.

13. The heat-pump system as claimed in claim 12, further comprising one or more of a compressor, an evaporator, and a condenser.

14. A building having a heat-pump system comprising a valve device comprising:
a valve-device housing having a plurality of openings configured for formation of fluid channels and/or connecting channels within the valve-device housing;
an electrical actuator arranged in or on the valve-device housing;
a first valve body arranged in the valve-device housing and configured for control and/or regulation of a first fluid stream, wherein the first valve body is configured to be adjusted by the electrical actuator;
a second valve body arranged in the valve-device housing and configured for control and/or regulation of a second fluid stream, wherein the second valve body is configured to be adjusted by the first fluid stream, a direction of motion of the second valve body is arranged parallel to and offset from a direction of motion of the first valve body; and
at least one of the plurality of openings is threaded and closed off by one of a threaded:
at least one pressure sensor,
at least one temperature sensor,
at least one temperature/pressure sensor, or
at least one temperature sensor and at least one pressure sensor.

15. The valve device for a heat-pump system as claimed in claim 1, wherein:
the first valve body is arranged in the valve-device housing in a first receptacle, and
the second valve body arranged in the valve-device housing in a second receptacle.

16. The valve device for a heat-pump system as claimed in claim 15, wherein the first receptacle and the second receptacle are fluidically connected by connecting channels arranged perpendicular to the first receptacle and the second receptacle.

17. The valve device for a heat-pump system as claimed in claim 16, wherein the connecting channels are arranged at longitudinal ends of the second receptacle.

* * * * *